(12) United States Patent
Ng et al.

(10) Patent No.: US 10,175,559 B1
(45) Date of Patent: Jan. 8, 2019

(54) SYSTEM AND METHOD FOR SELECTIVE FLASH FOR CAMERA (71) Applicant: MOTOROLA SOLUTIONS, INC., Chicago, IL (US)

(72) Inventors: Kok Khian Ng, Penang (MY); Daniel Grobe Sachs, Elmhurst, IL (US); Kuan Heng Lee, Penang (MY); Mern Keat Lee, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/803,441

(22) Filed: Nov. 3, 2017

(51) Int. Cl.
*G03B 15/05* (2006.01)
*H04N 5/225* (2006.01)
*H04N 5/235* (2006.01)
*H04N 5/353* (2011.01)

(52) U.S. Cl.
CPC .......... *G03B 15/05* (2013.01); *H04N 5/2256* (2013.01); *H04N 5/2354* (2013.01); *H04N 5/3532* (2013.01); *G03B 2215/0567* (2013.01); *G03B 2215/0592* (2013.01)

(58) Field of Classification Search
None
See application file for complete search history.

(56) References Cited

U.S. PATENT DOCUMENTS

| 7,745,771 | B2 | 6/2010 | Troxell et al. | |
| 9,225,916 | B2 | 12/2015 | Friel et al. | |
| 2002/0030416 | A1 | 3/2002 | Jinupun | |
| 2005/0168965 | A1* | 8/2005 | Yoshida | G03B 15/05 362/3 |
| 2005/0265014 | A1* | 12/2005 | Matsui | G03B 15/05 362/5 |
| 2006/0193622 | A1* | 8/2006 | Endo | G03B 7/16 396/157 |
| 2006/0263077 | A1* | 11/2006 | Endo | G03B 7/16 396/155 |
| 2007/0009162 | A1* | 1/2007 | Endo | G02B 7/36 382/232 |
| 2013/0120636 | A1* | 5/2013 | Baer | H04N 5/2354 348/335 |
| 2016/0112621 | A1* | 4/2016 | Nishi | H04N 5/2354 348/234 |

* cited by examiner

*Primary Examiner* — W B Perkey
(74) *Attorney, Agent, or Firm* — Michael Best & Friedrich LLP (57) ABSTRACT

A camera flash system and method for the same. In one example, the system includes a camera including an image sensor, a plurality of lights, and an electronic processor. The camera is configured to capture an image frame. Each of the lights is configured to illuminate a region within the image frame. The electronic processor is configured to capture via the camera, while modulating an output of the plurality of lights, a first image frame and determine, using the image sensor, an object of interest within the first image frame. The electronic processor is further configured to identify a region of interest in which the object of interest is located based on the first image frame, identify, based on the region of interest, a subset of lights from the plurality of lights, and activate the subset of lights.

18 Claims, 5 Drawing Sheets

SYSTEM AND METHOD FOR SELECTIVE FLASH FOR CAMERA

BACKGROUND OF THE INVENTION

Camera systems typically include a light or flash system for illuminating low light environments. In order to capture usable images in such environments, the light or flash may need to illuminate continuously. Continuous illumination may pull too much power from the camera battery, shortening the operation time of the camera.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The device and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel (first responders, investigators, and the like) responding to an incident scene may be equipped with video recording devices to document the response to an incident. For example, police officers on duty may be equipped with a body-worn camera and may be required to have the body-worn camera active when at an incident scene.

In some situations, a police officer or other first responder with such a camera may find themselves in a dark environment. In such an environment, the first responder may not be equipped or may not have time to activate a flashlight so that the incident scene may be recorded clearly, for example when the first responder is suddenly approached by a person. In addition, even if the body camera is equipped with a light source or camera flash system, the light source may pull too much power from the camera battery, shortening the operation time of the body camera. Accordingly, methods and systems are provided herein for a selective camera flash on a camera.

One example embodiment provides a camera flash system. The system the system includes a camera including an image sensor, a plurality of lights, and an electronic processor. The camera is configured to capture an image frame. Each of the lights is configured to illuminate a region within the image frame. The electronic processor is configured to capture, while modulating an output of the plurality of lights, a first image frame and determine, using the image sensor, an object of interest within the first image frame. The electronic processor is further configured to identify a region of interest in which the object of interest is located based on the first image frame, identify, based on the region of interest, a subset of lights from the plurality of lights, and activate the subset of lights.

Another example embodiment provides a method of selective camera flashing for a camera system. The method includes capturing via a camera, while modulating an output of a plurality of lights, a second image frame and determining, using an image sensor, an object of interest within the second image frame. The method further includes identifying a region of interest in which the object of interest is based on the second image, identifying, based on the region of interest, a subset of lights from the plurality of lights, and activating the subset of lights.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
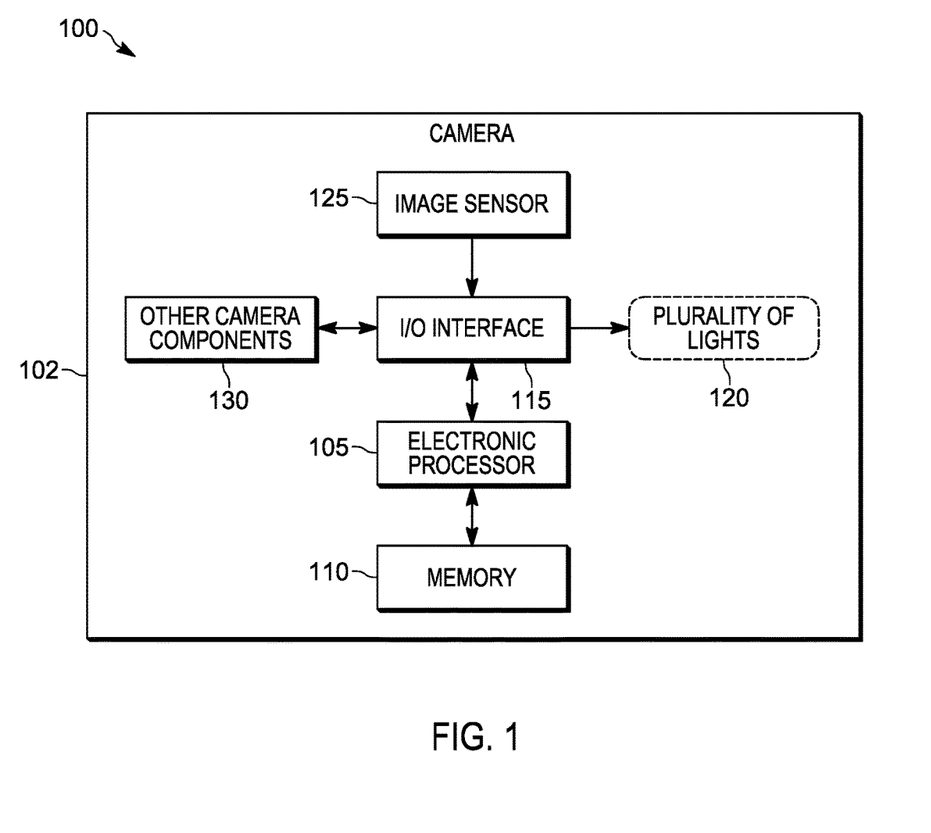
FIG. 1 is a diagram of a camera flash system in accordance with some embodiments.

FIG. 1 is a diagram of an example of a camera flash system 100. In the embodiment illustrated, the camera flash system 100 is integrated in a camera 102. The camera 102 is an image capture device for capturing images and/or video streams, by, for example, sensing light in at least the visible light spectrum. In some embodiments, the camera 102 may be integrated into a body-worn camera or smart glasses. The camera flash system 100 includes an electronic processor 105, a memory 110, an input and output (I/O) interface 115, and a plurality of lights 120. The camera 102 communicates the captured images/video streams to the electronic processor 105 via the I/O interface 115. It should be noted that the terms "image" and "images," as used herein, may refer to one or more digital images captured by the camera 102, or processed by the electronic processor 105. Further, the terms "image" and "images," as used herein, may refer to still images or sequences/series of images (that is, a video stream). It should be understood that in other embodiments, some or all of the components of the camera flash system 100 may be externally attached to the camera 102.

The electronic processor 105 obtains and provides information (for example, from the memory 110 and/or the I/O interface 115), and processes the information by executing one or more software instructions or modules, capable of being stored, for example, in a random access memory ("RAM") area of the memory 110 or a read only memory ("ROM") of the memory 110 or another non-transitory computer readable medium (not shown). The software can include firmware, one or more applications, program data, filters, rules, one or more program modules, and other executable instructions.

The memory 110 can include one or more non-transitory computer-readable media, and includes a program storage area and a data storage area. The program storage area and the data storage area can include combinations of different types of memory, as described herein. The electronic processor 105 is configured to retrieve from the memory 110 and execute, among other things, software related to the control processes and methods described herein. For example, as explained in more detail below, the electronic processor 105 is configured to implement a selective camera flash method 300 illustrated in FIG. 3.

The I/O interface 115 is configured to receive input from and to provide output to other components and peripherals of the camera flash system 100 and the camera 102. The I/O interface 115 obtains information and signals from, and provides information and signals to, (for example, over one or more wired and/or wireless connections) devices both internal and external to the camera flash system 100. For example, in the illustrated embodiment, the I/O interface 115 is coupled to a plurality of lights 120 and an image sensor 125. The I/O interface 115 may also be coupled to other additional camera components 130 of the camera 102 (for example, the exposure control and lens control of the camera 102). The plurality of lights 120 include two or more lights (for example, light emitting diodes) configured to emit light from the camera 102. In some embodiments, some of the lights 120 are configured to emit light in the visible light spectrum and some are configured to emit light in the invisible light spectrum (for example, infrared light). In other embodiments, at least one of the plurality of lights 120 is configured to switch between emitting visible spectrum light and invisible spectrum light. The plurality of lights 120 are configured to emit light to be reflected off objects in front of the camera 102. The reflected light is received by a lens 202 (see FIG. 2A and FIG. 2B) of the camera 102 and is processed by the image sensor 125 to produce an image frame. The image frame is then further processed by the electronic processor 105.

Figure 2A:
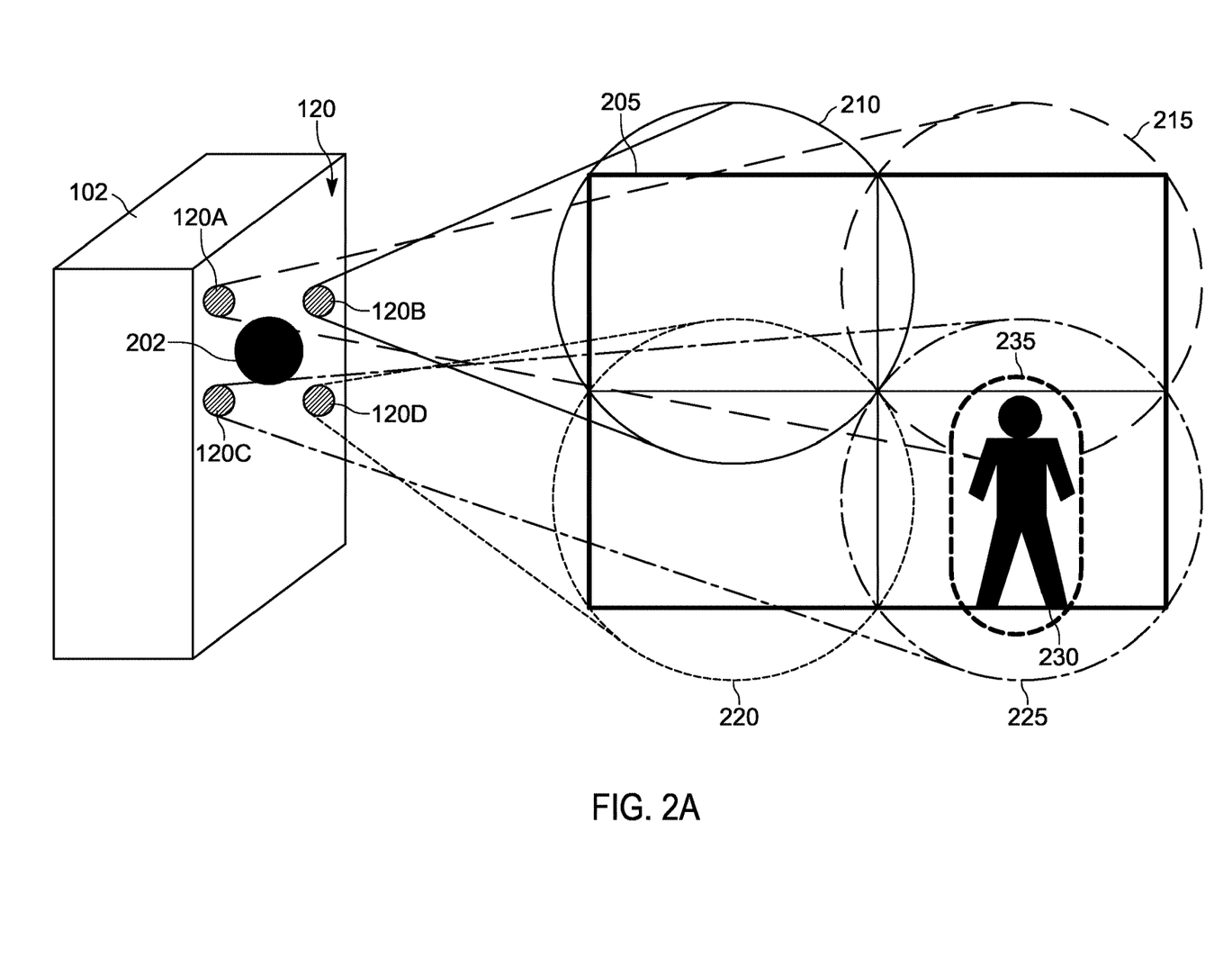
FIG. 2A is a diagram illustrating aspects of the operation of the camera flash system of FIG. 1 in accordance with some embodiments.

FIG. 2A is a diagram illustrating aspects of the operation of the camera flash system 100. The plurality of lights 120 (illustrated as lights 120A-120D) of the camera 102 emit light in front of the camera 102 to capture an image frame 205 of a scene in front of the lens 202. Specifically, each light 120A, 120B, 120C, and 120D of the plurality of lights 120 is configured to illuminate a particular region 210, 215, 220 and 225, respectively, of the image frame 205. In some embodiments, each of the plurality of lights 120 include a lens configured to alter a light projection angle of the light they emit, affecting the particular region. For example, light 120A correlates to the region 215 that the light 120 illuminates. In some embodiments, the each of the plurality of lights 120 is individually controllable. In other embodiments, the plurality of lights 120 may be divided into groups, each of which is controllable. Finally, the plurality of lights may be grouped such that one set of one or more groups of lights illuminates the entire scene using visible light, or another set of one or more groups of lights illuminates the entire scene using invisible light.

Figure 3:
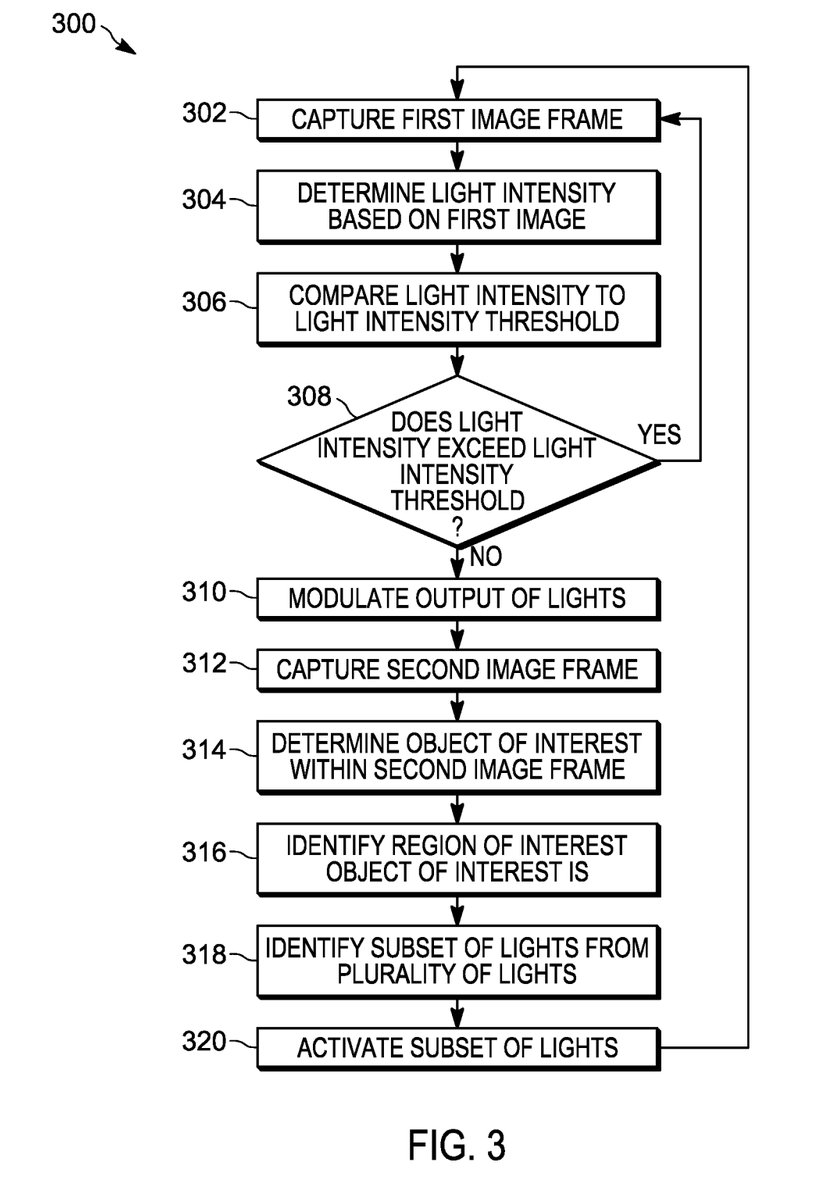
FIG. 3 is a flowchart of a method of selective camera flashing for the camera flash system of FIG. 1 in accordance with some embodiments.

FIG. 3 is a flowchart of the selective camera flash method 300 for the camera flash system 100. As an example, the method 300 is described as being performed by the camera flash system 100, the camera 102, and, in particular, the electronic processor 105. At block 302, the electronic processor 105 receives a first image frame from the image sensor 125. The electronic processor 105 determines a light intensity based on the first image frame (block 304). The light intensity correlates to a level of brightness of the scene captured by the camera 102. At block 306, the electronic processor 105 compares the light intensity to a light intensity threshold. When the light intensity exceeds the light intensity threshold (block 308), the electronic processor 105 returns to block 302 of the method 300. When the light intensity fails to exceed the light intensity threshold (block 308), the electronic processor 105 modulates an output of the plurality of lights 120 (block 310) at a predetermined rate. In some embodiments, the electronic processor 105 modulates a particular subset of the plurality of lights 120. For example, when the plurality of lights 120 include both visible spectrum lights and invisible spectrum lights, the electronic processor 105 may modulate only the invisible spectrum lights of the plurality of lights 120. In some embodiments, the electronic processor 105 modulates the plurality of lights 120 to illuminate the scene at a low frequency rate (for example, approximately every 0.1 seconds, 0.5 seconds or 1 seconds) and/or light intensity. At block 312, the electronic processor 105, while modulating the output of the plurality of lights 120, captures a second image frame. The electronic processor 105 determines, with the image sensor 125, an object of interest within the second image frame (block 314). An object of interest may be, for example as illustrated in FIG. 2A, a person 230. The person 230 may be posing a threat to someone in proximity of or towards the bearer of the camera 102 (for example, execute a sudden movement directed towards the bearer of the camera 102). In some embodiments, the object of interest is an object that is suddenly moving towards the bearer of the camera 102.

Returning to FIG. 3, at block 316, the electronic processor 105 identifies the region of interest that the object of interest is located based on the second image frame and, at block 318, identifies, based on the region of interest, a subset of lights from the plurality of lights 120. For example, in the embodiment illustrated in FIG. 2A, the person 230 is located in a region of interest 235. The region of interest 235 is located within the regions 215 and 225 within the image frame 205. The region 215 corresponds to the region illuminated by the light 120A and the region 225 corresponds to the region illuminated by the light 120C. Thus, the subset of lights identified by the electronic processor 105 would comprise the lights 120A and 120C. In this particular case, the lights 120A and 120C may be activated with high frequency rate (for example 30 cycles/second or higher), while the remaining lights 120B and 120D may continue to be activated at low frequency rate (for example 10 cycles/second). In some embodiments, the type of lights included in the subset of lights may be a particular kind of light. For example, at least one of the subset of lights may emit visible spectrum light.

Returning to FIG. 3, at block 320 the electronic processor 105 activates the subset of lights. The electronic processor 105 may then return to block 302 and capture another image frame. The electronic processor 105 is configured to update the region of interest when the object of interest moves outside of the region of interest. For example, the electronic processor 105 may analyze the image frame captured at block 312 after the electronic processor 105 has executed the method 300 a first time, for the object of interest (or an additional object of interest) to determine if the region of interest has changed. When the region of interest has changed, the electronic processor 105 updates the subset of lights to include the lights from the plurality of lights 120 that correspond to the new region of interest.

Figure 2B:
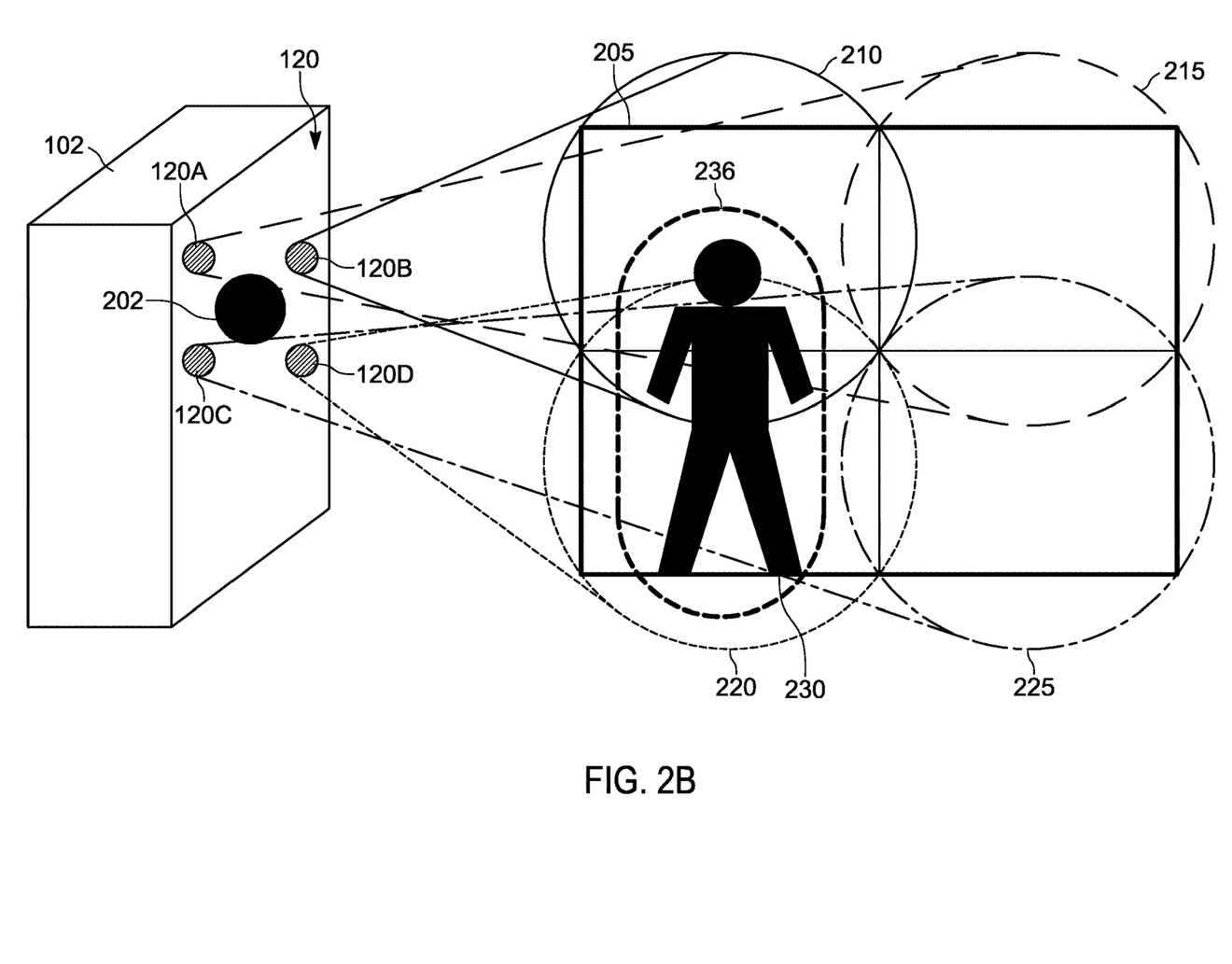
FIG. 2B is a diagram illustrating aspects of the operation of the camera flash system of FIG. 1 in accordance with some embodiments.

For example, FIG. 2B illustrates a diagram of FIG. 2A with the person 230 having moved to a different region in the image frame 205. The electronic processor 105 may capture, while activating the subset of lights (lights 120A and 120C), a second region of interest 236 in which the object of interest (the person 230) is located based on a third image frame captured by the camera 102. The electronic processor 105 then identifies, based on the second region of interest 236, a second subset of lights from the plurality of lights 120 (in this case, the lights 120B and 120D). The electronic processor 105 then activates the second subset of lights. In some embodiments, the method 300 may only include blocks 312, 314, 316, 318, and 320.

Figure 4:
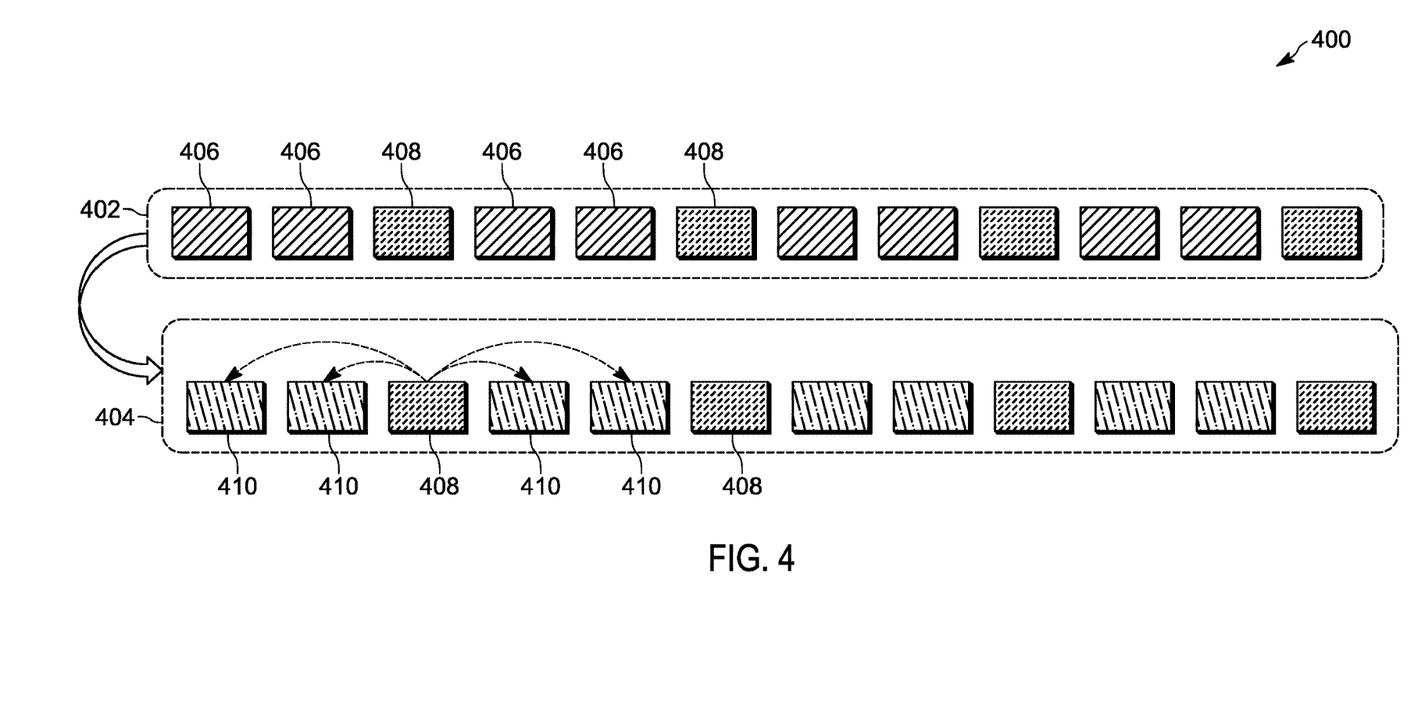
FIG. 4 is a diagram illustrating an image enhancement implemented by the camera system of FIG. 1 in accordance with some embodiments.

In some embodiments, the method 300 may also be used by the electronic processor 105 to implement an image frame enhancement process. FIG. 4 illustrates a diagram illustrating an image enhancement process 400 implemented by the camera flash system 100. As an example, the process 400 is described as being performed by the camera flash system 100, the camera 102, and, in particular, the electronic processor 105. The electronic processor 105 collects a series of unenhanced image frames 402, each frame following or taken after a previous frame. The series of unenhanced image frames 402 include a plurality of low exposure image frames 406. The low exposure image frames 406 are image frames that have a low level of exposure within a portion of or all of the frame. For example, the first image frame captured at block 302 in FIG. 3 may have a low level of exposure throughout the frame. In the case illustrated in FIG. 2A, the region 210 may not be illuminated since the object of interest is not within the region 210 in the frame 205 captured at block 312 of FIG. 3. The series of unenhanced image frames 402 also include exposed frames 408. The exposed frames 408 are image frames that have a particular level of exposure from at least one of the plurality of lights 120 (for example, the second image frame captured at block 312). The particular light(s) of the plurality of lights 120 that provide exposure for the exposed frames 408 may be configured to expose either or both visible light and invisible light. The electronic processor 105 is configured to enhance each of the low exposure image frames 406 by performing a motion compensation (or edge sharpening) process based on the exposed frames 408, producing enhanced image frames 410. The enhanced image frames 410 in combination with the exposed frames 408 together create an enhanced series of image frames 404. In some embodiments, the electronic processor 105 is further configured to process the exposed frames 408 as an I-frame or a P-frame for a video compression process.

The systems and methods herein may be used to aid police and other public safety personnel in the performance of their duties. For example, in some embodiments, the system 100 may be implemented on a body worn camera. Typically, the camera is always turned on when the public safety officer the device approaches an incident scene. By controlling the flash feature of the camera as described herein, battery power may be conserved and useable images of suspects and other objects of interest may be captured in low-light situations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms for example first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") for example microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A camera flash system, the system comprising:
a camera including an image sensor and configured to capture an image frame;
a plurality of lights each configured to illuminate a particular region within the image frame;
an electronic processor configured to:
receive, from the camera, a first image frame,
determine a light intensity based on the first image frame,
compare the light intensity to a light intensity threshold,
modulate, when the light intensity fails to exceed the light intensity threshold, an output of the plurality of lights,
capture via the camera, while modulating the output of the plurality of lights, a second image frame,
determine, using the image sensor, an object of interest within the second image frame,
identify a region of interest in which the object of interest is located based on the second image frame,
identify, based on the region of interest, a subset of lights from the plurality of lights; and
activate the subset of lights.

2. The system of claim 1, wherein the electronic processor is further configured to, while activating the subset of lights, capture at least one image frame corresponding to the region of interest.

3. The system of claim 1, wherein each light of the plurality of lights is configured to emit a light from least one selected from the group consisting of a visible spectrum and an invisible spectrum.

4. A camera flash system, the system comprising:
a camera including an image sensor and configured to capture an image frame;
a plurality of lights each configured to illuminate a particular region within the image frame;
an electronic processor configured to:
capture via the camera, while modulating an output of the plurality of lights, a first image frame,
determine, using the image sensor, an object of interest within the first image frame,
identify a region of interest in which the object of interest is located based on the first image frame,
identify, based on the region of interest, a subset of lights from the plurality of lights,
activate the subset of lights,
capture, while activating the subset of lights, a second image frame, and
enhance the second image frame following the first image frame by performing a motion compensation process based on the first image frame.

5. The system of claim 4, wherein the electronic processor processes the second image frame as an I-frame or a P-frame for a video compression process.

6. The system of claim 1, wherein each light of the plurality of lights includes a lens configured to alter a light projection angle of the light.

7. A camera flash system, the system comprising:
a camera including an image sensor and configured to capture an image frame;
a plurality of lights each configured to illuminate a particular region within the image frame;
an electronic processor configured to:
capture via the camera, while modulating an output of the plurality of lights, a first image frame,
determine, using the image sensor, an object of interest within the first image frame,
identify a region of interest in which the object of interest is located based on the first image frame,
identify, based on the region of interest, a subset of lights from the plurality of lights,
activate the subset of lights, and
modulate the output of the plurality of lights, when the light intensity fails to exceed the light intensity threshold, at a predetermined rate when the camera is activated.

8. A camera flash system, the system comprising:
a camera including an image sensor and configured to capture an image frame;
a plurality of lights each configured to illuminate a particular region within the image frame;
an electronic processor configured to:
capture via the camera, while modulating an output of the plurality of lights, a first image frame,
determine, using the image sensor, an object of interest within the first image frame,
identify a region of interest in which the object of interest is located based on the first image frame,
identify, based on the region of interest, a subset of lights from the plurality of lights,
activate the subset of lights, and
identify a second region of interest in which the object of interest is located based on a second image frame captured by the camera,
identify, based on the second region of interest, a second subset of lights from the plurality of lights, and
activate the second subset of lights.

9. The system of claim 1, wherein at least one light of the plurality of lights is a light emitting diode.

10. A method of selective camera flashing for a camera system, the method comprising:
receiving, from a camera, a first image frame;
determining a light intensity based on the first image frame;
comparing the light intensity to a light intensity threshold;
when the light intensity fails to exceed the light intensity threshold, modulating an output of a plurality of lights;
capturing via a camera, while modulating an output of a plurality of lights, a second image frame;
determining, using an image sensor, an object of interest within the second image frame;

identifying a region of interest in which the object of interest is based on the second image;

identifying, based on the region of interest, a subset of lights from the plurality of lights; and activating the subset of lights.

11. The method of claim 10, the method further comprising, while activating the subset of lights corresponding to the region of interest, capturing at least one image frame corresponding to the region of interest.

12. The method of claim 10, wherein each light of the plurality of lights is configured to emit a light from least one selected from the group consisting of a visible spectrum and an invisible spectrum.

13. A method of selective camera flashing for a camera system, the method comprising:

capturing via a camera, while modulating an output of a plurality of lights, a second image frame;

determining, using an image sensor, an object of interest within the second image frame;

identifying a region of interest in which the object of interest is based on the second image;

identifying, based on the region of interest, a subset of lights from the plurality of lights;

activating the subset of lights;

capturing, while activating the subset of lights, a second image frame and enhancing the second image frame following the first image frame by performing a motion compensation process based on the first image frame.

14. The method of claim 13, wherein the method further includes processing the first image frame as an I-frame or a P-frame for a video compression process.

15. The method of claim 10, wherein each light of the plurality of lights includes a lens configured to alter a light projection angle of the light.

16. A method of selective camera flashing for a camera system, the method comprising:

capturing via a camera, while modulating an output of a plurality of lights, a second image frame;

determining, using an image sensor, an object of interest within the second image frame;

identifying a region of interest in which the object of interest is based on the second image;

identifying, based on the region of interest, a subset of lights from the plurality of lights;

activating the subset of lights; and modulating the output of the plurality of lights, when the light intensity fails to exceed the light intensity threshold, at a predetermined rate when the camera is activated.

17. A method of selective camera flashing for a camera system, the method comprising:

capturing via a camera, while modulating an output of a plurality of lights, a second image frame;

determining, using an image sensor, an object of interest within the second image frame;

identifying a region of interest in which the object of interest is based on the second image;

identifying, based on the region of interest, a subset of lights from the plurality of lights;

activating the subset of lights; and identifying a second region of interest in which the object of interest is located based on a second image frame captured by the camera, identifying, based on the second region of interest, a second subset of lights from the plurality of lights, and activating the second subset of lights.

18. The method of claim 10, wherein at least one light of the plurality of lights is a light emitting diode.

* * * * *